(12) United States Patent
Kang et al.

(10) Patent No.: US 12,221,701 B2
(45) Date of Patent: Feb. 11, 2025

(54) WELDED MEMBER OF GALVANIZED STEEL SHEETS

(71) Applicant: POSCO CO., LTD, Pohang-si (KR)

(72) Inventors: Ki-Cheol Kang, Gwangyang-si (KR); Sang-Ho Uhm, Incheon (KR); Chang-Woon Jee, Gwangyang-si (KR); Yeon-Chae Jeong, Gwangyang-si (KR); Kwang-Tai Min, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/622,583

(22) Filed: Mar. 29, 2024

(65) Prior Publication Data

US 2024/0240299 A1 Jul. 18, 2024

Related U.S. Application Data

(62) Division of application No. 17/414,231, filed as application No. PCT/KR2019/018005 on Dec. 18, 2019, now abandoned.

(30) Foreign Application Priority Data

Dec. 19, 2018 (KR) .......................... 10-2018-0164821

(51) Int. Cl.
C23C 2/06 (2006.01)
C21D 8/02 (2006.01)
(Continued)

(52) U.S. Cl.
CPC ............... *C23C 2/06* (2013.01); *C21D 8/0205* (2013.01); *C21D 8/0226* (2013.01);
(Continued)

(58) Field of Classification Search
CPC ........... C23C 2/06; C23C 2/40; C22C 38/001; C22C 38/002; C22C 38/008; C22C 38/02;
(Continued)

(56) References Cited

U.S. PATENT DOCUMENTS 6,558,815 B1 5/2003 Suzuki et al.
2013/0327452 A1 12/2013 Fushiwaki et al.
(Continued)

FOREIGN PATENT DOCUMENTS

CN 1343262 4/2002
CN 101910441 12/2010
(Continued)

OTHER PUBLICATIONS

Chinese Office Action—Chinese Application No. 201980085280.1 issued on Nov. 18, 2022, citing CN 105531389, KR 10-1589913, CN 1343262, CN 108431273, CN 101910441, JP 2011-153349, CN 107002207, and CN 105658832.

(Continued)

*Primary Examiner* — Katherine A Christy (74) *Attorney, Agent, or Firm* — CANTOR COLBURN LLP (57) ABSTRACT

A welded member includes: a first steel sheet including a base steel sheet and a zinc-based plating layer formed on a surface of the base steel sheet; and a second steel sheet spot-welded on the first steel sheet and facing the zinc-based plating layer of the first steel sheet, a spot-welded zone being formed between the first steel sheet and the second steel sheet. A surface layer of the base steel sheet has a decarburization ratio of 30% or more. The decarburization ratio is represented by equation: Decarburization ratio (%) of surface layer=(1−average carbon concentration in surface layer/bulk carbon concentration)*100 where the surface layer refers to a region of the base steel sheet from the surface thereof to a depth of 35 μm. A shoulder portion of the spot-welded zone includes a B-type crack having a length of 100 μm or less, and no C-type crack.

8 Claims, 1 Drawing Sheet

(51) Int. Cl.
    *C21D 9/46* (2006.01)
    *C22C 38/00* (2006.01)
    *C22C 38/02* (2006.01)
    *C22C 38/06* (2006.01)
    *C22C 38/22* (2006.01)
    *C22C 38/24* (2006.01)
    *C22C 38/26* (2006.01)
    *C22C 38/32* (2006.01)
    *C22C 38/38* (2006.01)
    *C23C 2/02* (2006.01)
    *C23C 2/28* (2006.01)
    *C23C 2/40* (2006.01)

(52) U.S. Cl.
    CPC ............. *C21D 8/0236* (2013.01); *C21D 9/46* (2013.01); *C22C 38/001* (2013.01); *C22C 38/002* (2013.01); *C22C 38/008* (2013.01); *C22C 38/02* (2013.01); *C22C 38/06* (2013.01); *C22C 38/22* (2013.01); *C22C 38/24* (2013.01); *C22C 38/26* (2013.01); *C22C 38/32* (2013.01); *C22C 38/38* (2013.01); *C23C 2/02* (2013.01); *C23C 2/0222* (2022.08); *C23C 2/0224* (2022.08); *C23C 2/024* (2022.08); *C23C 2/28* (2013.01); *C23C 2/40* (2013.01)

(58) Field of Classification Search
    CPC ......... C22C 38/06; C22C 38/22; C22C 38/24; C22C 38/26; C22C 38/32; C22C 38/38
    See application file for complete search history.

(56) References Cited

U.S. PATENT DOCUMENTS

| | | |
|---|---|---|
| 2015/0337408 A1 | 11/2015 | Schulz et al. |
| 2016/0230259 A1 | 8/2016 | Tanaka et al. |
| 2017/0369974 A1 | 12/2017 | Kim et al. |
| 2018/0105908 A1 | 4/2018 | Hayashi et al. |
| 2018/0371570 A1 | 12/2018 | Kim et al. |
| 2020/0190652 A1 | 6/2020 | Takeda et al. |
| 2020/0325554 A1 | 10/2020 | Takeda et al. |

FOREIGN PATENT DOCUMENTS

| | | |
|---|---|---|
| CN | 103154297 | 6/2013 |
| CN | 105531389 | 4/2016 |
| CN | 105658832 | 6/2016 |
| CN | 107002207 | 8/2017 |
| CN | 108431273 | 8/2018 |
| EP | 3045558 | 7/2016 |
| JP | 2002088459 | 3/2002 |
| JP | 2007211279 | 8/2007 |
| JP | 2010222674 | 10/2010 |
| JP | 2011117041 | 6/2011 |
| JP | 2011153349 | 8/2011 |
| JP | 2011219780 | 11/2011 |
| JP | 2011246744 | 12/2011 |
| JP | 2012251229 | 12/2012 |
| JP | 2013117043 | 6/2013 |
| JP | 2015054990 | 3/2015 |
| JP | 2017075394 | 4/2017 |
| JP | 6388099 | 9/2018 |
| JP | 2018188717 | 11/2018 |
| KR | 20140131203 | 11/2014 |
| KR | 101589913 | 2/2016 |
| KR | 20180069567 | 6/2018 |
| KR | 20190073200 | 6/2019 |
| WO | 2016171237 | 10/2016 |

OTHER PUBLICATIONS

European Search Report—European Application No. 19898057.5 issued on Dec. 22, 2021, citing EP 3045558, Zhang et al., US 2018/0105908, and JP 2011-153349.
International Search Report—PCT/KR2019/018005 dated Apr. 2, 2020.
Japanese Office Action—Japanese Application No. 2021-534943 issued on Jan. 31, 2023, citing JP 2017-075394, JP 2011-246744, JP 2002-088459, JP 2011-153349, JP 2013-117043, JP 2015-054990, JP 2018-188717, JP 6388099, WO 2016/171237, KR 10-2014-0131203, and KR 10-1589913.
Japanese Office Action—Japanese Application No. 2021-534943 issued on Jul. 26, 2022, citing JP 2015-054990, JP 2002-088459, JP 2018-188717, JP 6388099, KR 10-2014-0131203, and KR 10-1589913.
Zhang et al., New parameters for the description of hot rolled strip transverse temperature distribution: preliminary applications, Ironmaking & Steelmaking: Processes, Products and Applications, vol. 36, No. 4, pp. 311-315.

WELDED MEMBER OF GALVANIZED STEEL SHEETS

TECHNICAL FIELD

The present disclosure relates to a high-strength galvanized steel sheet having excellent electrical resistance spot weldability, and a method of manufacturing the same.

BACKGROUND ART

Regulations on vehicle emissions and fuel economy have been strengthened due to problems such as environmental pollution. Accordingly, there has been strong demand for reduction of fuel consumption by reducing weights of steel sheets of vehicles, and accordingly, various types of high strength steel sheets having high strength per unit thickness have been developed and released.

High-strength steel generally refers to steel having strength of 490 MPa or more, but is not necessarily limited thereto. High-strength steel may include transformation induced plasticity (TRIP) steel, twin induced plasticity (TWIP) steel, dual phase (DP) steel, complex phase (CP) steel, and the like.

A vehicle steel material may be supplied in the form of a plated steel sheet having a plated surface to ensure corrosion resistance, and among such plated steel sheets, a galvanized steel sheet (GI steel sheet) or a galvannealed steel sheet (GA) is increasingly used as a material for vehicles since they may have high corrosion resistance via sacrificed protection property of zinc.

When the surface of the high-strength steel sheet is plated with zinc, however, spot weldability may degrade, which may be problematic. In other words, in the case of high-strength steel, since tensile strength and also yield strength may be high, it may be difficult to resolve tensile stress generated during welding through plastic deformation, such that it may be highly likely that microcracks may be created on the surface. When welding is performed on a high-strength galvanized steel sheet, zinc having a low melting point may permeate into the microcracks of the steel sheet, and as a result, a phenomenon known as liquid metal embrittlement (LME) may occur, such that the steel sheet may fracture, which may be a big obstacle for increasing strength of the steel sheet.

Also, in the case of a high strength steel sheet, alloy elements such as Mn, Al, and Si included in the steel sheet may react with the atmosphere and oxides may be formed on the surface of the steel sheet. In this case, there may be problems in surface quality of the plated steel sheet, such as a degradation of plating adhesion.

DISCLOSURE

Technical Problem

An aspect of the present disclosure is to provide a high-strength galvanized steel sheet having excellent electrical resistance spot weldability, and a method of manufacturing the same.

The purpose of the present disclosure is not limited to the above description. A person skill in the art would have no difficulty in understanding an additional purpose of the present disclosure from an overall description in the present specification.

Technical Solution

A galvanized steel sheet according to an aspect of the present disclosure comprises a base steel sheet and a zinc-based plating layer formed on the base steel sheet, wherein the surface layer of the base steel sheet may have a decarburization ratio of at least 30% as represented by equation 1.

[Equation 1]: Decarburization ratio (%) of surface layer= (1−average carbon concentration in surface layer/bulk carbon concentration)*100, where the surface layer refers to a region extending to a depth of 35 μm from the surface of the base steel sheet.

A method of manufacturing a galvanized steel sheet according to an aspect of the present disclosure comprises: obtaining a hot-rolled steel sheet by hot-rolling a steel slab; obtaining a hot-rolled steel sheet by coiling the hot-rolled steel sheet at a temperature of 590-750° C.; heating an edge portion of the coiled hot-rolled steel sheet at 600-800° C. for 5 to 24 hours in a nitrogen atmosphere including 0.5-2% of oxygen; obtaining a cold-rolled steel sheet by cold-rolling the hot-rolled steel sheet; annealing the cold-rolled steel sheet in an atmosphere of a dew point of −10-30° C. at 650-900° C. while allowing the cold-rolled steel sheet to pass at a passing speed of 40-130 mpm; and hot-dip galvanizing the annealed cold-rolled steel sheet.

Advantageous Effects

As described above, according to the present disclosure, by forming a decarburized layer on the surface of base iron directly below a plating layer, a galvanized steel sheet having excellent surface quality and excellent LME resistance to resistance spot weldability may be manufactured.

BEST MODE FOR INVENTION

Figure 1:
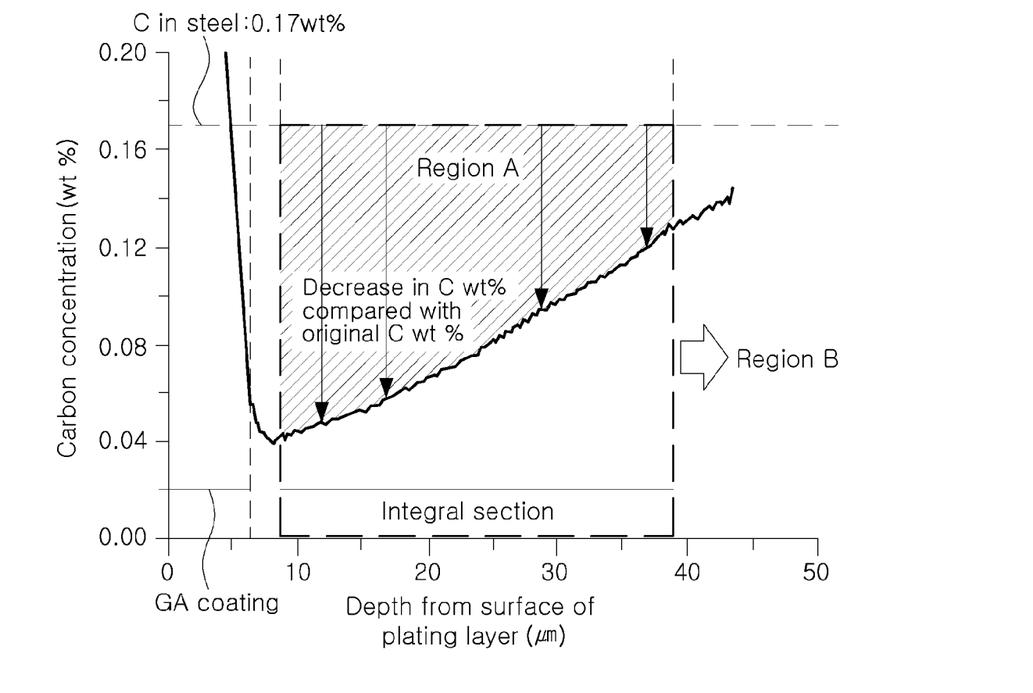
FIGURE is a graph illustrating a section in which integration at a profile of a carbon concentration is carried out to measure a degree of decarburization.

Hereinafter, the present disclosure will be described in greater detail.

In the present disclosure, the galvanized steel sheet in the present disclosure may include a galvanized steel sheet (GI steel sheet), a galvannealed steel sheet (GA), and also plated steel sheet mainly including zinc. The notion "mainly including zinc" may indicate that a ratio of zinc is the highest among the elements included in a plating layer. However, in the galvannealed steel sheet, a ratio of iron may be higher than that of zinc, and a ratio of zinc may be the highest among the elements other than iron.

The inventors of the present disclosure focused on the fact that the cause of liquid metal embrittlement (LME) occurring during welding is microcracks created from the surface of a steel sheet, and the inventors researched on a means for inhibiting microcracks on the surface, and to this end, it has been found that it may be necessary to soften the surface of the steel sheet and the present disclosure has been devised.

Generally, high-strength steel may include a large amount of elements such as C, Mn, Si, Cr, Mo, V, and the like, to secure hardenability or austenite stability of the steel, and these elements may increase sensitivity to cracks of the steel. Therefore, microcracks may be easily created in the steel including a large amount of these elements, which may be a cause of liquid metal embrittlement during welding. According to the results of research conducted by the inventors, behavior of creation of such microcracks may be closely related to a carbon concentration, and since cracks may be created from the surface and may be propagated into steel, the possibility of microcracks may increase when the carbon concentration of the surface is high.

Therefore, in an embodiment of the present disclosure, the overall composition of the steel may have a high carbon concentration for high strength, and the carbon concentration of the surface layer, which may be the point in which cracks are created, may be low, that is, a decarburization ratio may be high, so as to have resistance against cracks.

In the present disclosure, the surface layer refers to a point within 35 μm in a depth direction from the surface of the steel sheet, and the decarburization ratio of the surface layer may be represented by equation [1] as below:

$$\text{Decarburization ration (\%) of surface layer} = \left(1 - \text{average carbon concentration in surface layer/bulk carbon concentration}\right) * 100 \quad \text{[Equation 1]}$$

In equation 1, the carbon concentration of the surface layer refers to an average value of the carbon concentration of the surface layer, and may be a value obtained by integrating a GDS (including all similar devices such as GDOES) profile of carbon from the surface of the base steel sheet up to the depth of 35 μm and dividing the integral value by the depth of 35 μm. Also, the bulk carbon concentration refers to the carbon concentration when there is no longer any change in the carbon concentration, even when moving in the depth direction on the GDS profile, and generally refers to the carbon concentration at a depth of ¼ of a thickness of the steel sheet. In this case, a carbon concentration of ¼ of the thickness of the steel sheet may be obtained by removing a portion of the steel sheet in the depth direction and performing GDS analysis.

In an embodiment of the present disclosure, the decarburization ratio of the surface layer may be based on a value measured in a central portion in a width direction. However, since the decarburization ratio of an edge portion in the width direction has a higher value than that of the central portion of the steel sheet in the width direction, when the decarburization ratio at the edge portion satisfies the value specified in the present disclosure, spot weldability may further improve. Here, the edge portion in the width direction refers to both ends of the cross-sectional surface of the steel sheet taken in the width direction, but when there is a problem in integrity of a sample, such as contamination of the ends, the edge portion may refer to a point within 1 mm in the width direction from the end.

As described above, the decarburization ratio may be 30% or more to sufficiently secure spot weldability through preventing LME in an embodiment of the present disclosure. According to another embodiment of the present disclosure, the decarburization ratio may be 40% or more, and in another embodiment, the decarburization ratio may be 50% or more.

The higher the decarburization ratio, the more advantageous it may be, and thus, an upper limit of the decarburization ratio may not be particularly limited. However, according to an embodiment of the present disclosure, an upper limit of the decarburization ratio may be determined to be 90%, in another embodiment, the upper limit of the decarburization ratio may be determined to be 80%, and in another embodiment, the upper limit of the decarburization ratio may be determined to be 70%.

According to an embodiment of the present disclosure, an internal oxide may be present in the surface layer of the base steel sheet. The internal oxide may include at least one or more of Si, Mn, Al, and Fe, and may further include an additional element derived from the composition of the base steel sheet.

The steel sheet in the present disclosure is not limited to any particular type as long as the steel sheet is a high-strength steel sheet having strength of 490 MPa or more. However, the steel sheet targeted in the present disclosure may include, although not necessarily limited thereto, by weight ratio, 0.05-1.5% of C, 2.0% or less of Si, 1.0-30% of Mn, 3% or less of S—Al (acid-soluble aluminum), 2.5% or less of Cr, 1% or less of Mo, 0.005% or less of B, 0.2% or less of Nb, 0.2% or less of Ti, 0.2% or less of V, 0.1% or less of Sb+Sn+Bi, and 0.01% or less of N. The remainder of the elements may be iron and other impurities, and further inclusion of other elements not listed above in the range of 1.0% or less in total may not be excluded. In the present disclosure, the content of each element is represented based on weight unless otherwise indicated. The above-described composition refers to the bulk composition of the steel sheet, that is, the composition at a point of ¼ of the thickness of the steel sheet (hereinafter, the same).

However, in some embodiments of the present disclosure, TRIP steel, and the like, may be used as the high-strength steel sheet. Each of the steels may have the composition as below.

Steel composition 1: 0.05-0.30% of C (preferably 0.10-0.25%), 0.5-2.5% of Si (preferably 1.0-1.8%), 1.5-4.0% of Mn (preferably 2.0-3.0%), 1.0% or less of S—Al (preferably 0.05% or less), 2.0% or less of Cr (preferably 1.0% or less), 0.2% or less of Mo (preferably 0.1% or less), 0.005% or less of B (preferably 0.004% or less), 0.1% or less of Nb (preferably 0.05% or less), 0.1% or less of Ti (preferably 0.001-0.05%), 0.05% or less of Sb+Sn+Bi, 0.01% or less of N, and the balance Fe and inevitable impurities. In some cases, elements not listed above but able to be included in the steel may be further included in the range of 1.0% or less in total.

Steel composition 2: 0.05-0.30% of C (preferably 0.10-0.2%), 0.5% or less of Si (preferably 0.3% or less), 4.0-10.0% of Mn (preferably 5.0-9.0%), 0.05% or less of S—Al (preferably 0.001-0.04%), 2.0% or less of Cr (preferably 1.0% or less), 0.5% or less of Mo (preferably 0.1-0.35%), 0.005% or less of B (preferably 0.004% or less), 0.1% or less of Nb (preferably 0.05% or less), 0.15% or less of Ti (preferably 0.001-0.1%), 0.05% or less of Sb+Sn+Bi, and 0.01% or less of N, and the balance Fe and inevitable impurities. In some cases, elements not listed above but able to be included in the steel may further be included in the range of 1.0% or less in total.

Also, when the element of which a lower limit of the content is not limited among the above-mentioned elements may be regarded as an arbitrary element, and the content of the element may include 0%.

According to an embodiment of the present disclosure, one or more plating layers may be included on the surface of the steel sheet, and the plating layer may be a zinc-based plating layer including a galvanized (GI) layer or a galva-annealed (GA) layer. In the present disclosure, since the Ceq ratio is appropriately controlled as described above, even when the zinc-based plating layer is formed on the surface of the steel sheet, the problem of liquid metal embrittlement occurring during spot welding may be prevented.

When the zinc-based plating layer is a GA layer, the degree of alloying (the content of Fe in the plating layer) may be controlled to be 8-13 weight %, and may be preferably 10-12 weight %. When the degree of alloying is not sufficient, the possibility of liquid metal embrittlement caused by zinc in the zinc-based plating layer permeating into microcracks may remain, and when the degree of alloying is too high, problems such as powdering may occur.

Also, the coating amount of the zinc-based plating layer may be 30-70 g/m². When the coating amount is too small, it may be difficult to obtain sufficient corrosion resistance. When the coating amount is too large, problems such as an increase in manufacturing costs and liquid metal embrittlement may occur. Thus, the coating amount may be controlled within the above-mentioned range. A more preferable range of the coating amount may be 40-60 g/m². This coating amount refers to the amount of plating layer coated on a final product. When the plating layer is a GA layer, the coating amount may increase due to alloying, and thus, the weight thereof may be slightly smaller before alloying. Since the coating amount may depend on the degree of alloying, the coating amount (the amount of plating from a plating bath) before alloying may be smaller by about 10%, although not limited thereto.

Hereinafter, an embodiment of manufacturing the steel sheet in the present disclosure will be described. However, the steel sheet in the present disclosure may not necessarily be manufactured according to the embodiment described below, and the embodiment may be one preferable method for manufacturing the steel sheet in the present disclosure.

First, a hot-rolled steel sheet may be manufactured by hot-rolling the steel slab having the above-described composition and coiling the steel sheet. The conditions such as heating (management of temperature in the case of direct rolling) or hot-rolling of the slab are not limited to any particular conditions, but in an embodiment of the present disclosure, the coiling temperature may be limited as below.

Coiling Temperature: 590-750° C.

The hot-rolled steel sheet may be coiled and stored in a coil form, and a slow cooling process may be performed on the coiled steel sheet. Oxidizing elements included in the surface layer of the steel sheet may be removed by the process. When the coiling temperature of the slab is too low, the coil may be slowly cooled at a temperature lower than the temperature required for oxidation removal of these elements, and thus, it may be difficult to sufficiently obtain the effect. When the coiling temperature is too high, a deviation in temperatures between a central portion and an edge portion in the width direction may increase, such that a deviation in mechanical properties may increase. In this case, cold-rolling properties may degrade, strength of the final product may be lowered, and also formability may be deteriorated. Also, in terms of surface oxidation, when the coiling temperature is too high, reoxidation of scale may occur such that $Fe_2O_3$ may be formed. In this case, surface quality may be deteriorated. Therefore, in an embodiment of the present disclosure, an upper limit of the coiling temperature may be determined to be 750° C.

Heating Edge Portion of Hot-Rolled Coil: Performed for 5-24 Hours at 600-800° C.

In an embodiment of the present disclosure, the edge portion of the hot-rolled coil may be heated to increase the decarburization ratio of the edge portion. Heating of the edge portion of the hot-rolled coil may include heating both ends of the coiled coil in the width direction, that is, the edge portions, and the edge portion may be preferentially heated to a temperature suitable for oxidation by heating the edge portions. That is, in the coiled coil, while an internal portion may be maintained at a high temperature, the edge portion may be cooled relatively swiftly, such that the time of being maintained at a temperature suitable for internal oxidation may be shorter than that at the edge portion. Therefore, the removal of the oxidizing element at the edge portion may not be active as compared to the central portion in the width direction. The heating of the edge portion may be used as one method for removing oxidizing elements at the edge portion.

In other words, when the edge portion is heated, the edge portion may be preferentially heated, conversely from the case of cooling after coiling, and accordingly, the temperature of the edge portion in the width direction may be maintained to be suitable for internal oxidation, and as a result, the thickness of the internal oxide layer of the edge portion may increase. To this end, the heating temperature of the edge portion may need to be 600° C. or higher (based on the temperature of the edge portion of the steel sheet). When the temperature is too high, however, scale may be excessively formed at the edge portion during heating or porous high oxidized scale (hematite) may be formed such that surface condition may deteriorate after pickling. Thus, the temperature of the edge portion may be 800° C. or less. A more preferable heating temperature for the edge portion may be 600-750° C.

Also, to eliminate unevenness of the Ceq value of the surface layer between the edge portion in the width direction and the central portion, generated during coiling, the time of heating the edge portion may need to be 5 hours or more. When the time of heating the edge portion is too long, scale may be excessively formed or the decarburization ratio value of the surface layer at the edge portion may be too high. Therefore, the time of heating the edge portion heating time may be 24 hours or less.

According to an embodiment of the present disclosure, the heating of the edge portion may be performed by a combustion heating method by adjusting an air-fuel ratio. That is, an oxygen fraction in the atmosphere may be changed by adjusting the air-fuel ratio, and as the oxygen partial pressure is higher, the oxygen concentration in contact with the surface layer of the steel sheet may be exceeded, such that decarburization or internal oxidation may increase.

In an embodiment of the present disclosure, the atmosphere may be controlled to be the nitrogen atmosphere including 0.5-2 volume % of oxygen by adjusting the air-fuel ratio, although not necessarily limited thereto. A person skilled in the art to which the present disclosure belongs to may control the oxygen fraction by adjusting the air-fuel ratio without any particular difficulty, and thus, the description thereof will not be provided.

Pickling may be performed on the hot-rolled steel sheet having gone through the above processes, and cold-rolling may be performed as occasion demands. After the above-described cold-rolling process, a process of annealing the steel sheet may be followed. Since the decarburization ratio of the surface layer may be varied greatly even in the process of annealing the steel sheet, in an embodiment of the present disclosure, the annealing process may be controlled under conditions for appropriately controlling the decarburization ratio of the surface layer, and a passing speed and a dew point in the annealing furnace may be controlled under the conditions as below.

Passing Speed: 40-130 Mpm

To ensure sufficient productivity, the passing speed of the cold-rolled steel sheet may be 40 mpm or more. However, when the passing speed is excessively high, it may be disadvantageous in terms of securing mechanical properties. In an embodiment of the present disclosure, an upper limit of the passing speed may be determined to be 130 mpm.

Further, the passing speed may affect the thickness of the internal oxide layer, and as the passing speed is low, the thickness of the internal oxide may increase and the carbon content tends to decrease. Thus, an excessive high passing speed may be a factor preventing the thickness of the internal oxide layer from being sufficiently formed. According to an example, at a passing speed of more than 130 mpm, the internal oxide layer may be formed to have a thickness of 3 μm or less.

Annealing Conditions: Performed at 650-900° C. in Dew Point Atmosphere of −10-30° C.

In the present disclosure, the temperature at which the annealing is performed may be 650° C. or higher, which may be a temperature at which a sufficient internal oxidation effect is exhibited. However, when the temperature is too high, surface oxides of elements such as Si may be formed, such that oxygen may be prevented from diffusing internally, and austenite may excessively formed during heating at a soaking zone such that a carbon diffusion rate may degrade, and the degree of decarburization may reduce. Also, a load of annealing furnace may occur such that lifespan of facility may be reduced, and process costs may increase, which may be problematic, and thus, the temperature for controlling the dew point may be 900° C. or less. In the present disclosure, the temperature at which annealing is performed refer to the temperature of the soaking zone.

In this case, it may be advantageous to control the dew point of the atmosphere in the annealing furnace so as to form a sufficient and uniform internal oxide layer. When the dew point is too low, surface oxidation, rather than internal oxidation, may occur, such that oxides such as Si or Mn may be formed on the surface. Therefore, the dew point may need to be controlled to be −10° C. or higher. When the dew point is too high on the contrary, oxidation of Fe may occur, and thus, the dew point may need to be controlled to be 30° C. or less.

In this case, the dew point may be adjusted by introducing wet nitrogen ($N_2+H_2O$) including 1-10 volume % of hydrogen into an annealing furnace.

The steel sheet annealed by this process may be directly dipped into a plating bath, and hot-dip galvanizing may be performed.

The steel sheet annealed by this process may be reheated at a plating bath temperature or higher (460-500° C.), and may be dipped into a plating bath, and hot-dip galvanization may be performed. According to an embodiment of the present disclosure, the thickness of the annealed steel sheet dipped into the plating bath may be adjusted to be 1.0-2.0 mm. According to an embodiment of the present disclosure, the plating bath may be a zinc-based plating bath, and may include 50 weight % or more of Zn.

Galvannealing (GA) Temperature: 480-560° C.

When the temperature is less than 480° C., the amount of diffused Fe may be small such that the degree of alloying may not be sufficient, and plating properties may degrade, and when the temperature exceeds 560° C., the problem of powdering caused by excessive alloying may occur, and the mechanical properties may be deteriorated due to transformation of retained austenite into ferrite. Thus, the galvannealing temperature may be determined to be within the above-described range.

In an embodiment of the present disclosure, to secure the sufficient degree of alloying, the galvannealing heat treatment time may be 1 second or more. However, when the alloying (galvannealing) heat treatment time is too long, the degree of alloying may exceed the range specified in the present disclosure, and thus, an upper limit of the alloying heat treatment time may be determined to be 5 seconds.

BEST MODE FOR INVENTION

Hereinafter, the present disclosure will be described in greater detail through examples. However, it should be noted that the following examples are only for exemplifying the present disclosure and not for limiting the scope of the present disclosure. This is because the scope of the present disclosure is determined by matters described in the claims and matters reasonably inferred therefrom.

EXAMPLES

A steel slab having a composition described in Table 1 (the other elements not listed in the table are Fe and impurities inevitably included. Also, B and N in the table are represented in ppm unit, and the remaining elements may be represented in weight % unit) below was hot-rolled, an edge portion of the hot-rolled coil was heated in a nitrogen atmosphere including oxygen, a pickling process was performed, the obtained cold-rolled steel sheet was annealed in an annealing furnace, the steel sheet was reheated to 480° C., and was immersed in a zinc-based plating bath including 0.13 weight % of Al, and hot-dip galvanization was performed. A galvannealing (GA) heat treatment was performed on the obtained hot-dip galvanized steel sheet for 4 seconds as necessary, thereby obtaining an alloyed hot-dip galvanized steel sheet.

Also, in the case of obtaining a hot-dip galvanized steel sheet without performing alloying, the cold-rolled steel sheet was annealed in an annealing furnace, was reheated, and was dipped in a zinc-based plating bath including 0.24 weight % of Al, and plating was performed. Thereafter, air knifing was performed, and the steel sheet was cooled, thereby obtaining a hot-dip galvanized (GI) steel sheet.

In all examples, a rolling reduction ratio during cold-rolling was 52%, a soaking zone temperature during annealing was determined to be 830° C. and a ratio of hydrogen included in wet nitrogen in the annealing furnace was determined to be 5.0 volume %. The other conditions for each examples are as in Table 2 (B and N in the table are represented in ppm unit, and the other elements are represented by weight %).

TABLE 2

| Steel type | C | Si | Mn | S-Al | Cr | Mo | B | Nb | Ti | V | Sb | Sn | Bi | N |
|---|---|---|---|---|---|---|---|---|---|---|---|---|---|---|
| A | 0.245 | 1.35 | 2.235 | 0.0032 | 0 | 0 | 14 | 0 | 0.032 | 0 | 0 | 0 | 0 | 16 |
| B | 0.194 | 1.405 | 2.295 | 0.031 | 0.014 | 0.04 | 15 | 0.03 | 0.019 | 0 | 0.01 | 0 | 0 | 14 |
| C | 0.156 | 1.425 | 2.645 | 0.0025 | 0.035 | 0 | 17 | 0 | 0.031 | 0 | 0 | 0.011 | 0 | 17 |
| D | 0.214 | 0.356 | 6.457 | 0.02 | 0.098 | 0 | 16 | 0.02 | 0.029 | 0 | 0.02 | 0 | 0 | 15 |
| E | 0.107 | 0.045 | 4.598 | 0.003 | 0 | 0 | 11 | 0 | 0.034 | 0.05 | 0 | 0 | 0.02 | 15 |

TABLE 2-continued

| Steel type | Classification | Coiling temperature (° C.) | Heating of edge portion | | | Annealing | | Galvannealing Temperature (° C.) |
| | | | Heating temperature (° C.) | Heating time (hr) | Oxygen fraction (%) | Passing speed (mpm) | Dew point of soaking zone (° C.) | |
|---|---|---|---|---|---|---|---|---|
| B | Comparative example 1 | 621 | 741 | 12 | 0.8 | 91 | 13 | 445 |
| A | Inventive example 1 | 601 | 701 | 11 | 0.7 | 66 | 14 | GI |
| E | Comparative example 2 | 612 | 704 | 42 | 0.9 | 75 | 14 | 514 |
| B | Comparative example 3 | 841 | 721 | 8 | 1.1 | 62 | 8 | 527 |
| D | Inventive example 2 | 614 | 635 | 6 | 0.7 | 68 | 13 | 512 |
| E | Comparative example 4 | 650 | 864 | 12 | 0.8 | 88 | 12 | GI |
| A | Comparative example 5 | 450 | 712 | 6 | 0.7 | 67 | 9 | 548 |
| A | Comparative example 6 | 601 | 712 | 11 | 1.1 | 84 | −20 | GI |
| C | Comparative example 7 | 594 | 655 | 11 | 0.9 | 25 | 14 | 521 |
| A | Inventive example 3 | 605 | 705 | 10 | 0.7 | 67 | 15 | 515 |
| B | Inventive example 4 | 621 | 705 | 12 | 1.2 | 68 | 13 | GI |
| C | Comparative example 8 | 615 | 615 | 10 | 1.4 | 98 | 42 | GI |
| C | Inventive example 5 | 685 | 685 | 7 | 1.3 | 66 | 14 | GI |
| D | Comparative example 9 | 631 | 548 | 7 | 0.8 | 85 | 8 | 531 |
| E | Inventive example 6 | 601 | 714 | 11 | 1.2 | 58 | 20 | 510 |
| B | Comparative example 10 | 631 | 705 | 10 | 4.5 | 74 | 16 | 505 |
| E | Comparative example 11 | 594 | 732 | 11 | 1.2 | 95 | 41 | 521 |
| B | Inventive example 7 | 604 | 684 | 11 | 1.3 | 71 | 11 | 542 |
| E | Comparative example 12 | 615 | 701 | 12 | 1.1 | 192 | 12 | 512 |
| B | Comparative example 13 | 594 | 674 | 14 | 1 | 68 | −21 | GI |
| D | Inventive example 8 | 624 | 705 | 12 | 0.8 | 81 | 14 | GI |
| A | Comparative example 14 | 615 | 684 | 11 | 0.01 | 74 | 14 | 517 |
| C | Inventive example 9 | 595 | 654 | 14 | 1.2 | 72 | 12 | 548 |
| D | Comparative example 15 | 612 | 654 | 10 | 1.4 | 64 | 39 | GI |
| A | Comparative example 16 | 605 | 685 | 11 | 1.2 | 95 | 12 | 584 |
| A | Comparative example 17 | 584 | 712 | 1 | 0.8 | 84 | 13 | 521 |

Properties of the hot-dip galvannealed (GA) steel sheet manufactured by the above-described process were measured, and the results of observing whether liquid metal embrittlement (LME) occurred during spot welding are listed in Table 3. Spot welding was performed along an edge portion of a cut portion obtained by cutting the steel sheet in the width direction. A spot welding current was applied twice and a hold time of 1 cycle was maintained after applying the current. Spot welding was performed in two types and three layers. Spot welding was performed by laminating in the order of evaluation material-evaluation material-GA 980DP 1.4t. After abrading a new electrode through using it 15 times at welding of soft material, the subject material was spot welded with the electrode and an upper limit current at which expulsion occurs was measured. After measuring the upper limit current, spot welding was performed 8 times for each welding current at a current lower than the upper limit current by 0.5 and 1.0 kA, a cross-sectional surface of the spot welded zone was precisely processed by electric discharge processing and was epoxy-mounted and ground, and a length of crack was measured using an optical microscope. When observed using an optical microscope, the magnification was designated to be 100 times, and when no crack was found at the magnification, it was determined that liquid metal embrittlement did not occur, and when a crack was found, the length thereof was measured using image analysis software. The sample in which B-type cracks formed on a shoulder portion of the spot welded zone was 100 μm or shorter was determined as good, and the sample in which no C-type cracks were observed was determined as good.

The decarburization ratio was calculated using the concentration value for each depth depending on elements using GDOES. The decarburization ratio of the surface layer was calculated according to equation 1 as described above. Tensile strength was measured through a tensile test by manufacturing a sample of the JIS-5 standard taken in the C direction. The degree of alloying and the coating amount were measured using a wet dissolution method using a hydrochloric acid solution. Sealer adhesion was observed by bonding the D-type structural adhesive for vehicles to the plated surface and bending the steel sheet at 90 degrees to see whether the plating peeled off. As for powdering, the plated material was bent to 90 degrees, the tape was adhered to the bent area and peeled off, and how much mm of the fallen off material of the plating layer was on the tape was observed. As for flaking, the sample was processed into a " ⊏ " shape, and it was observed whether the plating layer was fallen off from the processed portion.

TABLE 3

| Classification | Decarburization ratio % | Tensile strength (MPa) | Plating type | Fe alloying degree (wt %) | Coating amount (g/m$^2$) | Powdering (mm) | Flaking | Sealer adhesion | Occurrence of LME B-type length (μm) | Occurrence of LME C-type length (μm) |
|---|---|---|---|---|---|---|---|---|---|---|
| Comparative example 1 | 68 | 932 | GA | 5.1 | 53 | 2 | Defective | — | 48 | 0 |
| Inventive example 1 | 35 | 1154 | GI | — | 54 | — | — | Good | 45 | 0 |
| Comparative example 2 | 54 | 1105 | GA | 9.3 | 48 | 4 | Good | — | 24 | 0 |
| Comparative example 3 | 41 | 425 | GA | 9.6 | 49 | 1 | Good | — | 19 | 0 |
| Inventive example 2 | 61 | 1152 | GA | 9.2 | 59 | 1 | Good | — | 27 | 0 |
| Comparative example 4 | 43 | 907 | GI | — | 59 | — | — | Good | 43 | 0 |
| Comparative example 5 | 24 | 11920 | GA | 10.5 | 53 | 2 | Good | — | 245 | 384 |
| Comparative example 6 | 15 | 1184 | GI | — | 60 | — | — | Defective | 195 | 752 |
| Comparative example 7 | 39 | 945 | GA | 10.5 | 49 | 3 | Good | — | 51 | 0 |
| Inventive example 3 | 55 | 1195 | GA | 11.2 | 51 | 2 | Good | — | 27 | 0 |
| Inventive example 4 | 39 | 952 | GI | — | 59 | — | — | Good | 14 | 0 |
| Comparative example 8 | 48 | 954 | GI | — | 61 | — | — | Defective | 32 | 0 |
| Inventive example 5 | 59 | 945 | GI | — | 61 | — | — | Good | 52 | 0 |
| Comparative example 9 | 17 | 1148 | GA | 10.3 | 49 | 3 | Good | — | 156 | 512 |
| Inventive example 6 | 48 | 1178 | GA | 10.2 | 42 | 4 | Good | — | 63 | 0 |
| Comparative example 10 | 48 | 948 | GA | 10.5 | 51 | 1 | Good | — | 26 | 0 |
| Comparative example 11 | 65 | 1178 | GA | 10.4 | 45 | 4 | Good | — | 34 | 0 |
| Inventive example 7 | 41 | 921 | GA | 11.9 | 42 | 1 | Good | — | 15 | 0 |
| Comparative example 12 | 24 | 1154 | GA | 9.6 | 58 | 1 | Good | — | 165 | 194 |
| Comparative example 13 | 14 | 962 | GI | — | 56 | — | — | Defective | 152 | 592 |
| Inventive example 8 | 51 | 1151 | GI | — | 51 | — | — | Good | 52 | 0 |
| Comparative example 14 | 21 | 1125 | GA | 10.4 | 52 | 2 | Good | — | 154 | 254 |
| Inventive example 9 | 46 | 1195 | GA | 9.1 | 42 | 1 | Good | — | 35 | 0 |
| Comparative example 15 | 59 | 1154 | GI | — | 62 | — | — | Defective | 27 | 0 |
| Comparative example 16 | 38 | 1154 | GA | 16.5 | 42 | 11 | Good | — | 31 | 0 |
| Comparative example 17 | 21 | 1102 | GA | 10.2 | 44 | 4 | Good | — | 214 | 114 |

※1/4t Ceq refers to Ceq at the 1/4 point of the thickness of the steel sheet. In the table, the unit of each Ceq is weight %.

Inventive examples 1, 2, 3, 4, 5, 6, 7, 8 and 9 satisfied the compositional range suggested in the present disclosure, and the manufacturing method also satisfied the range in the present disclosure such that tensile strength, plating quality, coating amount, and the length of spot weld LME crack were good.

As for comparative example 1, the alloying temperature in the GA alloying process was controlled to be lower than the range suggested in the present disclosure. Accordingly, the degree of alloying was lower than the criteria, such that the surface was too bright, and the surface quality was poor, and also, flaking occurred and the plating surface quality was deteriorated.

As for comparative example 2, the heating time during the heat treatment of the edge portion exceeded the range specified in the present disclosure, and peroxidation occurred in the edge portion during the heat treatment process, such that red-colored hematite scale formed as the surface scale, and the thickness of the scale excessively increased. Also, during the pickling process after hot-rolling, the edge portion was excessively pickled and the surface roughness increased, such that the shape of the surface was non-uniform, and a non-uniform color defect in which the color of the surface was different from that of the central portion occurred.

As for comparative example 3, the coiling temperature during the hot-rolling process was higher than the range suggested in the present disclosure. Therefore, decarburization occurred sufficiently during the hot-rolling process, and as the dew point during annealing was determined to be high, a decarburization ratio of the surface layer was 40% or more. Also, even though plating surface quality and LME resistance were excellent, a deviation in mechanical properties occurred in the width direction, such that cold-roll and tensile strength were deteriorated.

As for comparative example 4, the temperature of the heat treatment furnace, exceeded the range suggested in the present disclosure, and peroxidation occurred at the edge portion during the heat treatment process, such that red hematite scale was formed on the surface. The thickness of the scale excessively increased. Also, during the pickling process after hot-rolling, the edge portion was excessively pickled and surface roughness increased, such that the shape of the surface was non-uniform after plating, and a non-uniform color defect in which the color of the surface was different from that of the central portion occurred.

As for comparative example 5, the coiling temperature during the hot-rolling process was controlled to be lower than the range suggested in the present disclosure. Therefore, the decarburization during the hot-rolling process did not sufficiently occur, and LME properties was deteriorated.

As for comparative examples 6 and 13, the dew point in the furnace during annealing was lower than the range suggested in the present disclosure. Even when a sufficient decarburization layer was formed in the entire width during the heating process by hot-rolling and the heating process in a heat treatment furnace, the dew point was not sufficiently high during the annealing process after cold-rolling, such that homogenization of carbon occurred and a sufficient level of decarburization was not obtained, and the length of LME crack after spot welding was defective in the entire width. In the case of the GI material, since the low dew point was low, sufficient internal oxidation did not occur, such that the surface oxide was excessively formed, and coating adhesion was deteriorated.

As for comparative example 7, the passing speed of the steel sheet in annealing was lower than the range suggested in the present disclosure. Sufficient time was given for the decarburization reaction in which steam in the annealing furnace reacted with the steel sheet, such that the criteria were satisfied when the LME crack at the spot welding was evaluated, but the manufacturing time increased such that productivity degraded, which may not be suitable for the manufacturing conditions.

As for comparative examples 8, 11 and 15, the dew point in the furnace during annealing was controlled to be higher than the range suggested in the present disclosure. Decarburization during hot-rolling and also decarburization during annealing sufficiently occurred, such that the LME resistance and plated surface quality were good, but Mn-based oxide was excessively formed, such that the oxide physically adhered to the surface of the hearth roll in the annealing furnace, which caused a dent, a defect on the steel sheet, and operability degraded.

As for comparative example 9, the heating temperature of the heat treatment furnace during the heat treatment of the edge portion was as lower than the range suggested in the present disclosure. A sufficient decarburization layer was not formed during hot-rolling, such that the criteria were not satisfied when LME cracks at the spot welding was evaluated, which was defective.

As for comparative example 10, the heating temperature and the heating time of the heat treatment furnace satisfied the range suggested in the present disclosure, but the oxygen fraction exceeded the suggested range. Peroxidation occurred on the edge portion during the heat treatment process, such that red hematite scale formed as the surface scale, and the thickness of the scale excessively increased. Also, the edge portion was excessively pickled during the pickling process after hot-rolling, such that high surface roughness increased, and the shape of the surface was non-uniform after plating, and a non-uniform color defect in which the color of the surface was different from that of the central portion occurred.

As for comparative example 12, the passing speed of the steel sheet during annealing heat treatment was controlled to be higher than the range suggested in the present disclosure. Since sufficient time was not given for the decarburization reaction in which the steam reacted with the steel sheet in the annealing furnace, the decarburization ratio of the surface layer of the steel sheet after annealing was not sufficient, and accordingly, LME cracks excessively occurred after spot welding, exceeding the criteria.

As for comparative example 14, the heating temperature and the heating time of the heat treatment furnace satisfied the range suggested in the present disclosure, but the oxygen fraction was lower than the suggested range. The decarburization layer of hot-rolled steel sheet was not sufficiently formed, and accordingly, the criteria were not satisfied when evaluating the LME crack after spot welding, which was defective.

As for comparative example 16, the alloying temperature in the GA alloying process exceeded the range suggested in the present disclosure. Due to the high degree of Fe alloying, the color was dark, such that surface quality was defective. When GA powdering was evaluated, excessive powdering occurred.

As for comparative example 17, the heating temperature of the heat treatment furnace satisfied the range suggested in the present disclosure, but the heating time of the heat treatment furnace was shorter than the range suggested in the present disclosure. A sufficient decarburization layer of hot-rolled steel sheet was not formed, such that the criteria were not satisfied when evaluating LME cracks after spot welding, which was defective.

What is claimed is:

1. A welded member including:
a first steel sheet including a first base steel sheet and a first zinc-based plating layer formed on a surface of the first base steel sheet; and
a second steel sheet spot-welded on the first steel sheet and facing the first zinc-based plating layer of the first steel sheet, a first spot-welded zone being formed between the first steel sheet and the second steel sheet,
wherein a surface layer of the first base steel sheet has a decarburization ratio of 30% or more, the decarburization ratio being represented by equation 1 as below, Decarburization ratio (%) of surface layer=(1−average carbon concentration in surface layer/bulk carbon concentration)*100 where the surface layer refers to a region of the first base steel sheet from the surface thereof to a depth of 35 μm, [Equation 1]

wherein a shoulder portion of the first spot-welded zone includes a B-type crack having a length of 100 μm or less, and no C-type crack.

2. The welded member of claim 1, further comprising: a third steel sheet spot-welded on an opposite side of the second steel sheet, a second spot-welded zone being formed between the first steel sheet and the third steel sheet,
wherein the third steel sheet includes a same steel sheet as the first steel sheet, and
wherein a shoulder portion of the second spot-welded zone includes a B-type crack having a length of 100 μm or less, and no C-type crack.

3. The welded member of claim 1, wherein the second steel sheet includes a same steel sheet as the first steel sheet.

4. The welded member of claim 1, wherein the decarburization ratio of the surface layer is 40% or more.

5. The welded member of claim 1, wherein a tensile strength of the first steel sheet is 490 Mpa or more.

6. The welded member of claim 1, wherein a coating amount of the first zinc-based plating layer is 30-70g/m$^2$.

7. The welded member of claim 1, wherein the first zinc-based plating layer is an hot-dip galvannealed (GA) layer having a degree of alloying of 8-13 weight %.

8. The welded member of claim 1, wherein the first base steel sheet has a composition including, by weight ratio, 0.05-1.5% of C, 2.0% or less of Si, 1.0-30% of Mn, 3% or less of S-Al (acid-soluble aluminum), 2.5% or less of Cr, 1% or less of Mo, 0.005% or less of B, 0.2% or less of Nb, 0.2% or less of Ti, 0.2% or less of V, 0.1% or less of Sb+Sn+Bi, and 0.01% or less of N.

* * * * *